United States Patent

Pantzar et al.

Patent Number: 5,971,670
Date of Patent: Oct. 26, 1999

[54] SHAFT TOOL WITH DETACHABLE TOP

[75] Inventors: Göran Pantzar, Årsunda; Björn Håkansson, Halmstad; Stefan Roman, Sandviken; Per-Anders Holmström, Ekerö, all of Sweden

[73] Assignee: Sandvik AB, Sandviken, Sweden

[21] Appl. No.: 08/793,123

[22] PCT Filed: Aug. 28, 1995

[86] PCT No.: PCT/SE95/00967

§ 371 Date: May 20, 1997

§ 102(e) Date: May 20, 1997

[87] PCT Pub. No.: WO96/06702

PCT Pub. Date: Mar. 7, 1996

[30] Foreign Application Priority Data

Aug. 29, 1994 [SE] Sweden .................................. 9402861

[51] Int. Cl.$^6$ .................................................. B23B 51/00
[52] U.S. Cl. ................................ 407/34; 407/54; 407/65; 407/119; 408/144
[58] Field of Search ..................... 407/34, 40, 46, 407/47, 51, 53, 54, 62, 63, 118, 119; 408/226, 239 R, 239 A, 144, 145; 279/62, 63, 64, 89, 90, 91, 93

[56] References Cited

U.S. PATENT DOCUMENTS

| | | | |
|---|---|---|---|
| D. 262,630 | 1/1982 | Logan, Jr. ........................ 407/54 X |
| 1,191,717 | 7/1916 | Moore ............................... 408/144 |
| 2,367,841 | 1/1945 | Monroe . | |
| 3,820,422 | 6/1974 | Rivin et al. ................... 408/144 X |
| 3,984,192 | 10/1976 | Wanner et al. ................. 408/226 |
| 4,040,765 | 8/1977 | Vig ................................. 408/239 A |
| 4,293,253 | 10/1981 | Ott .................................. 408/144 X |
| 4,583,888 | 4/1986 | Mori et al. ..................... 408/144 X |
| 4,642,003 | 2/1987 | Yoshimura ....................... 408/144 |
| 4,958,965 | 9/1990 | Strand et al. . | |
| 5,114,286 | 5/1992 | Calkins ............................ 408/226 |
| 5,171,109 | 12/1992 | Arai et al. ...................... 407/49 X |
| 5,186,739 | 2/1993 | Isobe et al. .................... 407/119 X |
| 5,496,137 | 3/1996 | Ochayon et al. ................. 408/226 |
| 5,685,671 | 11/1997 | Packer et al. .................. 407/63 X |

FOREIGN PATENT DOCUMENTS

| | | |
|---|---|---|
| 466 057 | 9/1928 | Germany . |
| 487 142 | 11/1929 | Germany . |
| 39 39 291 | 5/1991 | Germany . |
| 2 157 991 | 11/1985 | United Kingdom . |

Primary Examiner—Andrea L. Pitts
Assistant Examiner—Henry W. H. Tsai
Attorney, Agent, or Firm—Burns, Doane, Swecker & Mathis, L.L.P.

[57] ABSTRACT

A shaft tool for metal cutting machining, includes a cutting portion and a shaft portion. The cutting portion includes a fist part formed with a cutting edge, and a second part formed with an external screw thread. The first and second parts are of one-piece integral construction. The shaft portion includes an internal screw thread to which the external screw thread is removably secured.

9 Claims, 1 Drawing Sheet

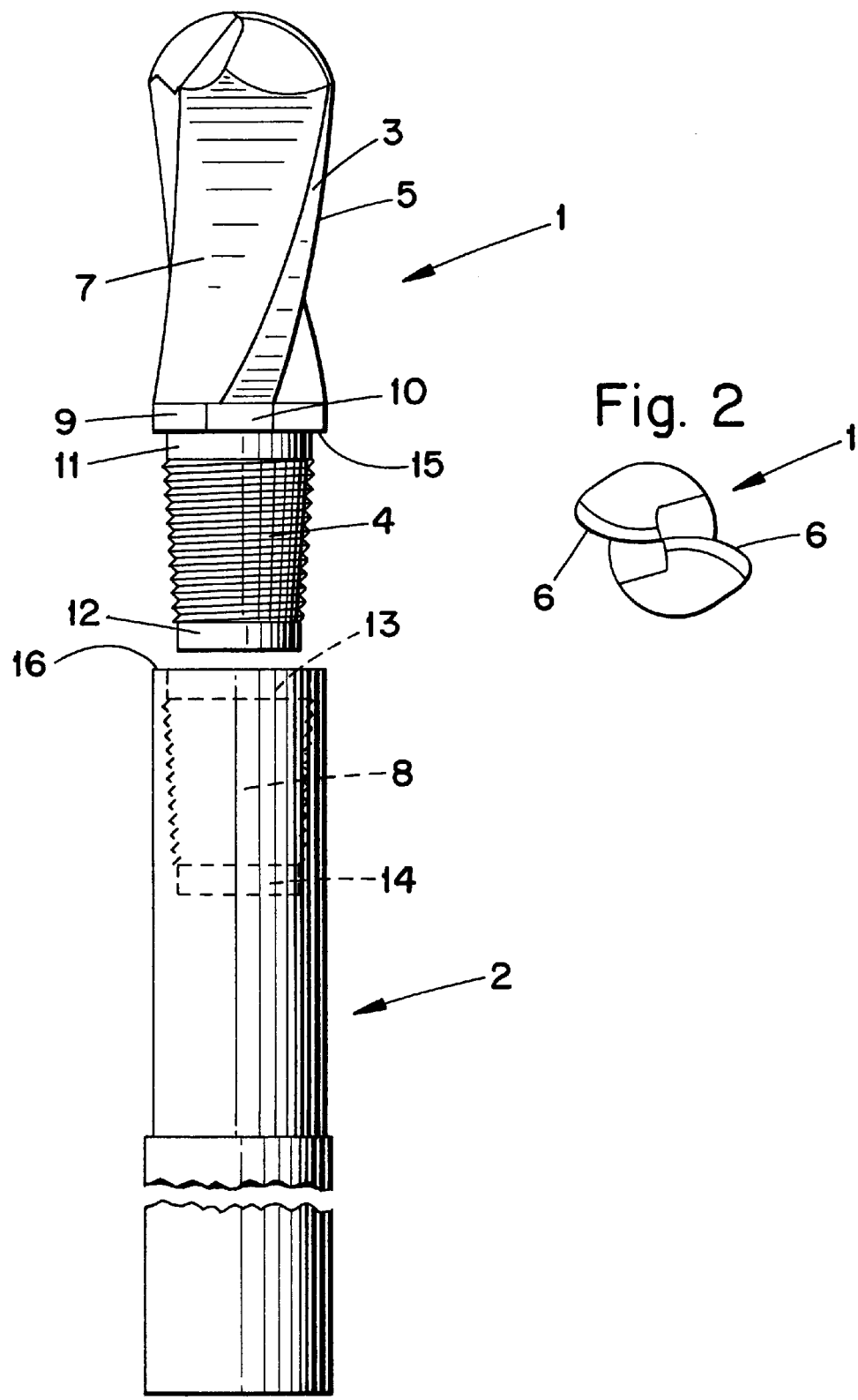

SHAFT TOOL WITH DETACHABLE TOP

BACKGROUND OF THE INVENTION

The present invention relates to a shaft tool with a detachable top for metal cutting machining.

Most rotating cutting tools comprise a shaft portion for fixing the tool in a holder and an operative cutting portion comprising cutting edges of a hard material such as cemented carbide, different ceramics, polycrystalline diamond and cubic boron nitride. The cemented carbide may be either coated or uncoated. Usually, the cutting edges consist of one or more of the edge lines on a cutting insert that is fastened upon and constitutes the active, cutting part of the operative cutting portion. This cutting insert is often fastened by a screw, the cutting insert having a through-hole, through which the screw is introduced. In other cases the cutting insert is fastened by a clamp or similar fastening or squeezing element; or by soldering or brazing. Although these well-known fastening arrangements function satisfactorily per se, they are all marred by different inconveniences. Thus, screws and clamps may for instance burst after repeated and/or too strong tightening, or they may sometimes loosen due to vibrations, which in a best case makes necessary a retightening but in a worst case may cause a tool breakdown. Moreover, soldering may cause brittleness and micro-cracks due to the heat when soldering, particularly in the soldered seam. Furthermore, a damaged soldered cutting insert cannot be replaced, wherefore the whole tool has to be disposed of, which of course increases costs. A further disadvantage in connection with locking screws is that it is time-consuming to screw and unscrew locking screws for the fastening of indexable cutting inserts, particularly when there are tens or even hundreds of cutting inserts to be mounted, demounted or indexed.

Tools that are smaller in volume, such as end mills and drills, are usually made integrally of one single piece, whereby they consist of the same hard material as the cutting edges. This brings the advantage that the boundary layer of a screw joint, a clamp joint, a soldered seam, etc, is avoided. On the other hand, this "entirety solution" entails that the expensive and sometimes brittle and heat variation sensible hard material also is present in tool parts where it would not be necessary, for instance in the shaft portion.

Still further fastening arrangements comprise wedges, draw bars, etc.

One drawback in connection with more bulky and material-demanding rotary cutting tools is that each individual tool requires its own material-demanding shaft portion, in spite of the fact that this portion is not worn to the same extent as the operative cutting portion.

Thus, a first object of the present invention is to provide a tool which in first hand is a rotating cutting tool and which comprises a simplest possible fastening arrangement between the shaft portion of the tool and the operative cutting portion.

A second object of the present invention is to decrease the material consumption when manufacturing the tool.

Still another object of the present invention is to lay the basis of a more flexible and polyvalent tool system.

SUMMARY OF THE INVENTION

These and further objects have been attained in a suprisingly simple way by a shaft tool for metal cutting machining comprising a cutting portion and a shaft portion. The cutting portion includes a first part formed with cutting edge, and a second part formed with an external screw thread. The first and second parts are of one-piece integral construction. The shaft portion includes an internal screw thread to which the external screw thread is removably secured.

BRIEF DESCRIPTION OF THE DRAWINGS

For illustrative but non-limiting purposes, an embodiment of the invention will now be further described in relation to the appended drawing. In the drawing are:

FIG. 1 a side view of an end mill according to the present invention, and

FIG. 2 a top view of the end mill according to FIG. 1.

DETAILED DESCRIPTION OF A PREFERRED EMBODIMENT OF THE INVENTION

An end mill according to the invention comprises a top or operative cutting portion 1 and a shaft portion 2. One essential feature of the invention is that the cutting portion 1 is made of one integral piece which thus includes both a part 3 provided with cutting edges and a part 4 provided with threads. The form of part 3 is not an essential feature of the present invention. According to the illustrated embodiment, it is formed as a ball end mill, which has helically twisted main cutting edges 5 and end cutting edges 6 which extend to the rotation axis of the tool. Between each pair of adjacent main cutting edges extends a chip flute 7. Other examples of feasible embodiments of the part 3 provided with cutting edges is a straight end mill, a side-milling cutter and a cylindrical cutter.

Another essential feature of the present invention is that the operative cutting portion 1 comprises the threaded part 4, which is intended to be threaded into hole 8 in the circular end surface of shaft portion 2, which hole is provided with a corresponding internal thread. The type of thread as such is not essential for the invention. Thus, the thread part 4 and the hole 8 can be made with different types of threads, each one being well-known as such, e.g., a V-thread with a triangular basic profile (for instance a normal metric thread or a so called M-thread), different pipe threads, trapezoid and square threads and also so called round-threads. The extension of the thread can describe a cylinder but preferably the thread has a conical extension, as shown in FIG. 1. The advantage with a conical thread is of course that the threads can be engaged and disengaged from each other by a short turning, suitably less than two revolutions. The thread is suitably continuous and uninterrupted on the basically cylindrical or conical surface, although it could also comprise truncated, longitudinally extending portions.

In order to make possible a fastening of the cutting portion 1 in the shaft portion 2 as stable as possible, the two portions are preferably provided with radial and/or axial abutment surfaces, suitably with both. The radial abutment surfaces consist of, on one hand, two cylindrical outer envelope surfaces 11 and 12 situated above and underneath, respectively, the thread of the cutting portion, and on the other hand of, two cylindrical, inner envelope surfaces 13 and 14 cooperating with the former and being located in the hole 8, above and underneath the hole thread, respectively. The axial abutment surfaces comprise a ring-shaped shoulder 15, and an end surface 16. The shoulder 15 is located in a radial plane situated between the parts 3 and 4 of the cutting portion. The end surface 16 is disposed on the shaft portion. It is possible to form the thread part 4 and the hole 8, respectively, with only one radial abutment surface which then is placed above the thread, i.e., in the position corresponding to surface 11.

In order to avoid an unintended untightening of the threads during use of the tool, the direction of the thread must be the same as the direction of rotation. According to the illustrated embodiment, the tool shall rotate clock-wise, wherefore the thread part 4 has a right-hand thread.

Since the production of such a cutting portion with threads is not possible by normal form pressing, or at least very complicated, the cutting insert is produced by an injection moulding technique known per se. In the plastic industry, this technique is a usual production technique for the production of different details. A paste consisting of or containing thermoplastic or thermo-setting polymers is heated to a suitable temperature and is then pressed through a die into a mould of desired geometry. In the powder metallurgy, injection moulding is used for the production of relatively complex details of metallic powder, such as cemented carbide powder. The cemented carbide powder is then mixed with polymers. After moulding, the polymer is removed, whereafter the detail is sintered in substantially the same way as for corresponding tool-pressed details.

In order to simplify the screwing and unscrewing, respectively, of the cutting portion 1 in the hole 8, the former has been provided with a short cylindrical intermediate portion 9 between the cutting edge-provided part 3 and the thread part 4, the portion 9 having one or more recesses 10 intended to function as key grips for tightening and untightening, respectively, of the cutting portion 1 by a suitable key.

Suitably, the shaft portion 2 is made of steel such as tool steel.

By the construction as described above, a number of adavantages have been attained. Thus, different threaded tops 1 can be replaced easily and quickly without detaching the shaft portion 2 out of its holder or out of the milling machine, e.g., from a straight end mill to a ball end mill, or from one diameter to another. Moreover, no further extra details as in the previously known technique are necessary, such as screws, clamps, wedges, draw bars, etc. Nor are any irreversible soldered seams necessary.

We claim:

1. A shaft tool for metal cutting machining, comprising a cutting portion and a shaft portion removably interconnected; the cutting portion including a fist part formed with a cutting edge, and a second part formed with a continuous uninterrupted external conical screw thread; the first and second parts being of one-piece integral construction and injection molded of cemented carbide; the shaft portion including an internal conical screw thread to which the external screw thread is removably secured; the cutting portion and shaft portion including mutually engageable radial abutment surfaces, separate from the screw threads, for positioning the cutting portion and shaft portion relative to one another in a radial direction with reference to a longitudinal axis of the tool; the radial abutment surfaces including first cylindrical abutment surfaces disposed at axial ends, respectively, of the external screw thread, and second cylindrical abutment surfaces disposed at axial ends, respectively, of the internal screw thread; the first cylindrical abutment surfaces engaging respective ones of the second cylindrical abutment surfaces; the cutting portion and the shaft portion including mutually engageable axial abutment surfaces for limiting axial convergence of the cutting portion and shaft portion.

2. The shaft tool according to claim 1, wherein the cutting portion and shaft portion include mutually engageable radial abutment surfaces, separate from the screw threads, for positioning the cutting portion and shaft portion relative to one another in a radial direction with reference to a longitudinal axis of the tool; the cutting portion and shaft portion including mutually engageable axial abutment surfaces for limiting axial convergence of the cutting portion and shaft portion.

3. The shaft tool according to claim 2, wherein the cutting portion includes cylindrical abutment surfaces disposed at axial ends, respectively, of the external screw thread; the shaft portion including cylindrical abutment surfaces disposed at axial ends, respectively, of the internal screw thread; the cylindrical abutment surfaces of the cutting portion engaging respective ones of the cylindrical abutment surfaces of the shaft portion.

4. The shaft tool according to claim 2, wherein the internal and external screw threads are of generally conical configuration.

5. The shaft tool according to claim 4, wherein the cutting portion includes circumferentially spaced recesses for receiving a turning key.

6. The shaft tool according to claim 1, wherein the internal and external screw threads are of generally conical configuration.

7. The shaft tool according to claim 1, wherein the cutting portion includes circumferentially spaced recesses for receiving a turning key.

8. The shaft tool according to claim 1, wherein the cutting portion comprises a ball end mill.

9. The shaft tool according to claim 1 wherein the first part includes a convex end surface on which the cutting edge is disposed, the end surface being intersected by a longitudinal axis of the tool.

\* \* \* \* \*